US009435965B2

(12) United States Patent
Togami et al.

(10) Patent No.: US 9,435,965 B2
(45) Date of Patent: Sep. 6, 2016

(54) SINGLE MODE FIBER ARRAY CONNECTOR FOR OPTO-ELECTRONIC TRANSCEIVERS

(71) Applicant: Cisco Technology, Inc., San Jose, CA (US)

(72) Inventors: Chris Kiyoshi Togami, San Jose, CA (US); Soham Pathak, Allentown, PA (US); Kalpendu Shastri, Orefiled, PA (US); Bipin Dama, Bridgwater, NJ (US); Vipulkumar Patel, Breinigsville, PA (US); Ravinder Kachru, Los Altos Hills, CA (US); Kishor Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 13/755,843

(22) Filed: Jan. 31, 2013

(65) Prior Publication Data

US 2013/0202255 A1    Aug. 8, 2013

Related U.S. Application Data

(60) Provisional application No. 61/593,356, filed on Feb. 1, 2012.

(51) Int. Cl.
*G02B 6/42* (2006.01)
*G02B 6/43* (2006.01)
*G02B 6/38* (2006.01)

(52) U.S. Cl.
CPC .............. *G02B 6/421* (2013.01); *G02B 6/423* (2013.01); *G02B 6/4204* (2013.01); *G02B 6/4244* (2013.01); *G02B 6/4292* (2013.01); *G02B 6/43* (2013.01); *G02B 6/3885* (2013.01); *G02B 6/4214* (2013.01)

(58) Field of Classification Search
None
See application file for complete search history.

(56) References Cited

U.S. PATENT DOCUMENTS

| | | | | |
|---|---|---|---|---|
| 5,671,315 A * | 9/1997 | Tabuchi | ............... | G02B 6/4208 385/137 |
| 5,933,558 A * | 8/1999 | Sauvageau | ........... | G02B 6/4292 385/88 |
| 6,056,448 A * | 5/2000 | Sauter | .................. | G02B 6/4292 385/89 |
| 6,318,909 B1 * | 11/2001 | Giboney | .............. | G02B 6/4201 257/700 |
| 6,739,762 B2 * | 5/2004 | Ukechi et al. | .................. | 385/89 |
| 6,767,141 B1 * | 7/2004 | Dudek | ................. | G02B 6/4292 385/53 |
| 6,821,027 B2 * | 11/2004 | Lee | ....................... | G02B 6/4249 385/89 |
| 6,821,028 B2 * | 11/2004 | Morris | ................ | G02B 6/4292 385/49 |
| 7,267,494 B2 * | 9/2007 | Deng et al. | ..................... | 385/92 |
| 7,334,948 B2 * | 2/2008 | Sasser | .................. | G02B 6/4201 385/89 |
| 7,449,674 B2 * | 11/2008 | Ueno | ..................... | G02B 6/423 250/227.11 |

(Continued)

*Primary Examiner* — Tina Wong
(74) *Attorney, Agent, or Firm* — Patterson + Sheridan, LLP (57) ABSTRACT

An apparatus for providing single mode optical signal coupling between an opto-electronic transceiver and a single mode optical fiber array takes the form of a lens array and a ferrule component. The lens array includes a plurality of separate lens element disposed to intercept a like plurality of single mode optical output signal from the opto-electronic transceiver and provide as an output a focused version thereof. The ferrule component includes a plurality of single mode fiber stubs that are passively aligned with the lens array and support the transmission of the focused, single mode optical output signals towards the associated single mode optical fiber array.

18 Claims, 6 Drawing Sheets

(56) References Cited

U.S. PATENT DOCUMENTS

| | | |
|---|---|---|
| 7,517,159 B1 | 4/2009 | Rolston et al. |
| 7,693,178 B2 | 4/2010 | Wojtowicz |
| 7,961,770 B1* | 6/2011 | Zhu et al. ................ 372/50.21 |
| 8,292,518 B2 | 10/2012 | Togami et al. |
| 8,714,836 B2* | 5/2014 | Daikuhara ........... G02B 6/3817 385/72 |
| 8,899,847 B2* | 12/2014 | Lin ..................... G02B 6/4214 385/89 |
| 9,297,967 B2* | 3/2016 | Rosenberg ........... G02B 6/4292 |
| 2003/0136968 A1* | 7/2003 | Fjelstad .......................... 257/82 |
| 2006/0013542 A1* | 1/2006 | Schunk ................ G02B 6/4201 385/92 |
| 2008/0095541 A1* | 4/2008 | Dallesasse ................... 398/191 |
| 2011/0164851 A1* | 7/2011 | Ishigami .............. G02B 6/4292 385/93 |
| 2011/0255574 A1 | 10/2011 | Carter et al. |
| 2011/0274400 A1 | 11/2011 | Mudd et al. |
| 2012/0027346 A1* | 2/2012 | Castagna ............ G02B 6/4206 385/33 |
| 2012/0308180 A1 | 12/2012 | Tosetti et al. |
| 2013/0039662 A1* | 2/2013 | Brooks et al. ................ 398/91 |

* cited by examiner

SINGLE MODE FIBER ARRAY CONNECTOR FOR OPTO-ELECTRONIC TRANSCEIVERS

CROSS-REFERENCE TO RELATED APPLICATIONS

This application claims the benefit of U.S. Provisional Application Ser. No. 61/593,356, filed Feb. 1, 2012 and herein incorporated by reference.

TECHNICAL FIELD

The present disclosure relates single mode optical fiber array connectors for use with integrated opto-electronic transceiver assemblies.

BACKGROUND

A small form factor pluggable (SFP) module is a standard component for an opto-electronic transceiver design and is defined by various industry standards. One arrangement comprises a "quad" configuration (QSFP) for use with an array of four input optical fibers and four output optical fibers. The fibers are coupled to an opto-electronic transceiver assembly that includes a laser diode array for transmitting optical signals and a photodiode array for receiving optical signals. The optical fibers are generally disposed in a linear array configuration within a fiber "connector" housing, and the housing is attached to the opto-electronic transceiver assembly.

A multiple fiber push-on/pull-off (MPO) connector is generally known in the art as a conventional type of connector suitable for use with a QSFP module. MPO connectors relate to standards such as, for example, IEC-61754-7 and EIA/TIA 604-5 (FOCIS 5). In most cases, multimode fibers are used in these configurations, which are only able to support optical transmission over short distances.

There are increasing demands to utilize single mode optical fibers with QSFP modules, since single mode signals can be used to support transmission over longer distances (e.g., tens of kilometers) and/or at higher bit rates (e.g., (10 Gb/s and higher) than dispersive multimode fiber.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Overview

An apparatus for providing single mode optical signal coupling between an opto-electronic transceiver and a single mode optical fiber array takes the form of a lens array and a ferrule component. The lens array includes a plurality of separate lens element disposed to intercept a like plurality of single mode optical output signal from the opto-electronic transceiver and provide as an output a focused version thereof. The ferrule component includes a plurality of single mode fiber stubs that are passively aligned with the lens array and support the transmission of the focused, single mode optical output signals towards the associated single mode optical fiber array.

Example Embodiments

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1:
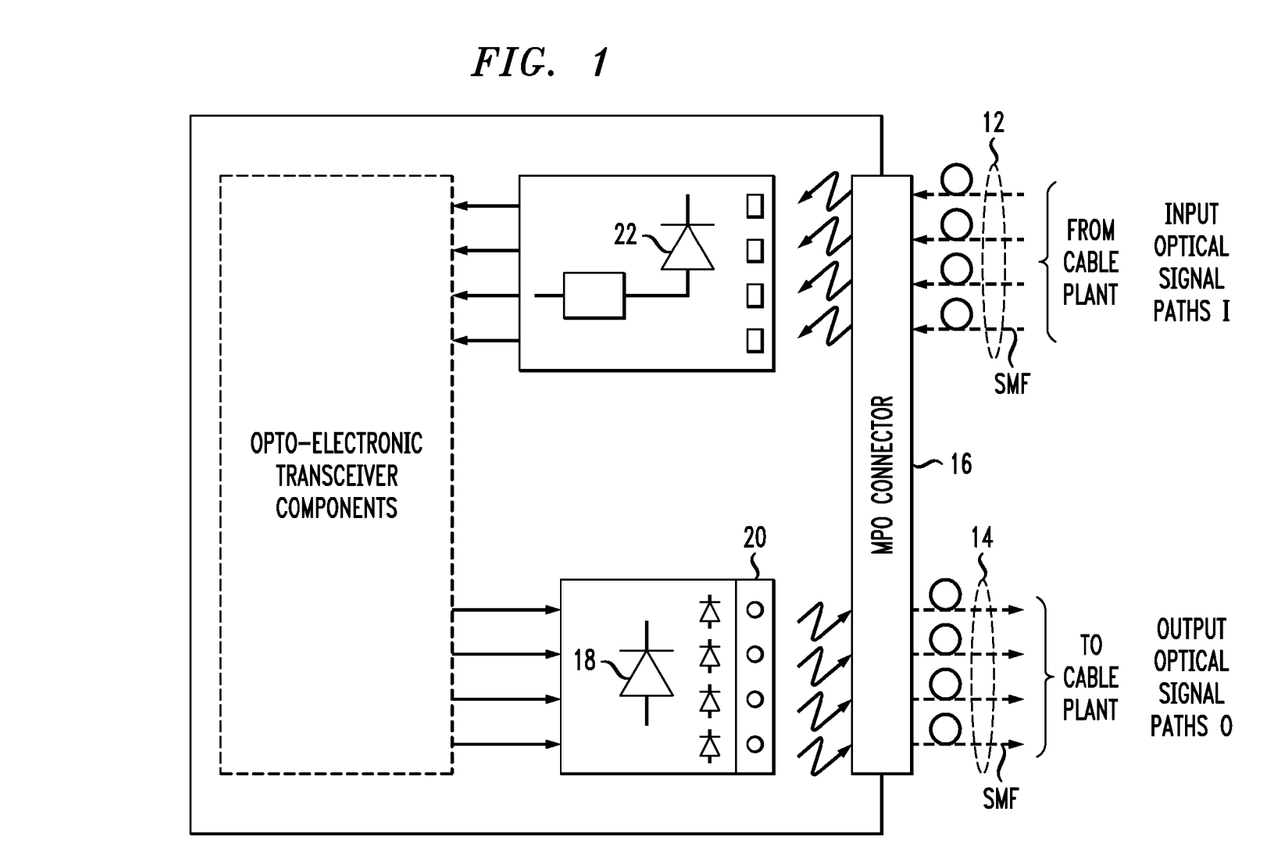
FIG. 1 is a block diagram depicting an example of functional components of an optical transceiver that may be packaged as a quad small form factor pluggable (QSFP) module.

FIG. 1 is a block diagram depicting an example of functional components of an optical transceiver that may be packaged as a quad small form factor pluggable (QSFP) module. As shown, module 10 is a "quad" arrangement including a set of four input optical signal paths I and a set of four output optical signal paths O. As will be discussed below, these signal paths take the form of single mode fibers for the purposes of the present invention, represented in FIG. 1 as an input single mode fiber array 12 and an output single mode fiber array 14. These single mode fiber arrays 12, 14 are coupled to module 10 through a connector 16. In this particular embodiment, connector 16 comprises a multiple fiber push-on/pull-off (MPO) connector. However, other specific connector configurations may be utilized. The specific internal components within connector 16 will be discussed below.

Included within module 10 is a set of four laser diodes 18, each creating a separate single mode optical output signal. These single mode optical signals thereafter pass through a lens array 20, which functions to collimate the spreading the light beam emitted by each lasing device. The collimated light beams are then ultimately coupled into the separate fibers forming single mode output fiber array 14. Module 10 also includes a set of four photodiodes 22 for receiving the set of single mode optical input signals from input single mode fiber array 12.

It is to be understood that the internal structures and functioning of a typical opto-electronic transceiver in the form of module 10 includes many other components, where a discussion of the operations of these components is not considered as required for an understanding of the present disclosure, which is related to coupling single mode optical signals between an opto-electronic transceiver and an array of single mode optical fibers.

As mentioned above, many prior art QSFP modules are based upon multimode optical signals and, therefore, arrays of multimode optical fibers are included as part of an MPO connector. However, there is a growing demand for single mode QSFP transceivers that can transmit data to much further distances than possible with multimode arrangements (e.g., 20 km or more, as compared with 3-5 km of multimode configurations) and/or transit data at rates exceeding 10 Gb/s, for example. Problems arise with directly aligning single mode optical fibers with the set of optical signals creating by a laser array, since the core region of single mode fiber is on the order of 9 μm (compared with a multimode fiber having a nominal core diameter of 62.5 μm).

Figure 2:
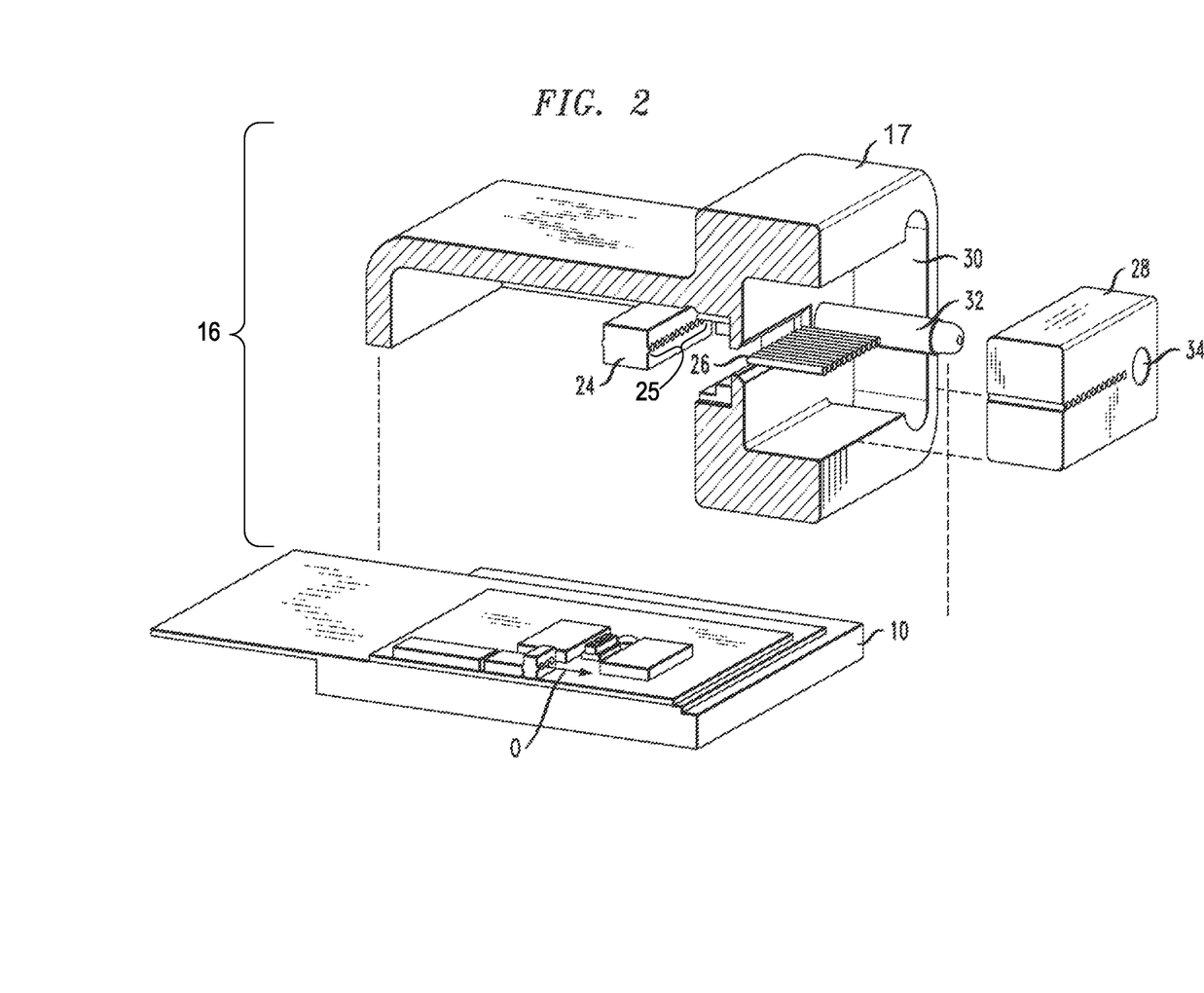
FIG. 2 is a cut-away isometric view of a connector configured to provide aligned optical signal paths between a QSFP module and an array of single mode optical fibers.

FIG. 2 is a cut-away isometric view of a connector configured to provide aligned optical signal paths between a QSFP module and an array of single mode optical fibers (the actual array of single mode fibers (which may be in the form of a "ribbon" connector) is not shown in FIG. 2 since the details of a conventional ribbon connector are not germane to the subject matter of this disclosure). The illustration in FIG. 2 is a cut-away isometric and exploded view, showing only a portion of an exemplary opto-electronic transceiver module 10 as described above in FIG. 1 and its associated connector 16. As shown in FIG. 2, connector 16 includes a lens array 24 that will receive the (collimated) single mode optical output signals O created by module 10. Lens array 24 includes a plurality of individual lens elements 25, where each lens element 25 will receive a separate one of the collimated output signals OS from module 10. Further contained within connector 16 is a plurality of single mode fiber stubs 26 which are supported within a ferrule 28.

In an exemplary assembly process, single mode fiber stubs 26 are first placed within ferrule 28, with ferrule 28 then positioned within an aperture 30 an outer housing 17 of connector 16. It is an aspect of one or more embodiments of the present disclosure that passive optical alignment is achieved between lens array 24 and single mode fiber stubs 26 by the use of alignment fiducials formed on connector housing 17 and ferrule 28. In the particular embodiment shown in FIG. 2, alignment fiducials comprise a pair of alignment pins 32 formed within aperture 30 of connector housing 17 and an associated pair of alignment holes 34 formed within ferrule 28. Inasmuch as the configuration of FIG. 2 is a cut-away view, only a single alignment pin 32 and alignment hole 34 is shown.

Passive alignment between ferrule 28 and lens array 24 is achieved by physically mating the alignment fiducials, in the case of the particular arrangement of FIG. 2, by inserting alignment pins 32 into alignment holes 24. The mating of the two components will result in the core region of each single mode fiber stub 26 being aligned with an associated lens element 25 of lens array 24.

It is to be understood that the specific fiducial configuration as shown in FIG. 2 is exemplary only, and various other types of alignment markers may be used to create a passively aligned connection between lens array 24 and ferrule 28. For example, pyramidal detents and hemispherical features may be formed on the joining surfaces. Additionally, a different number of alignment fiducials may be used. For example, the arrangement as shown in FIG. 2 may also include an alignment fiducial formed along the upper and lower joining faces components, in addition to the pair of side-placed fiducials associated with the arrangement of FIG. 2.

Once ferrule 28 is fixed in position within connector housing 17, a conventional alignment process is then used to optically align connector 16 with module 10 in a manner such that the set of single mode optical output signals O will intercept lens array 24 of connector 16. Although not shown in FIG. 2, connector 16 fiber is thereafter coupled to a conventional optical cable, such as a ribbon cable, that comprises a plurality of single mode optical fibers used to support the transmission of the propagating optical signals.

Figure 3:
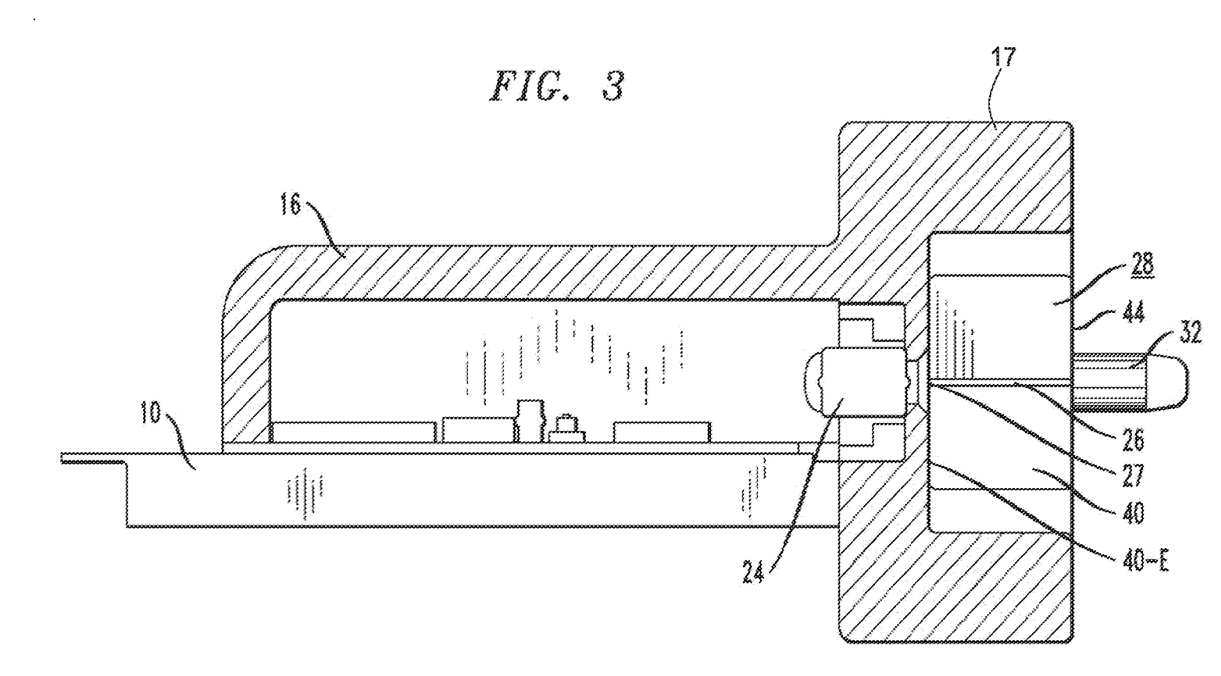
FIG. 3 is a cut-away side view of the arrangement of FIG. 2, with the connector disposed over and attached to the QSFP module.

FIG. 3 is a cut-away side view of the arrangement of FIG. 2, with the connector disposed over and attached to the QSFP module. In this view, ferrule 28 is shown as positioned within aperture 30 of connector 16, with an exemplary single mode fiber stub 16 shown as aligned with an exemplary lens element 25 within lens array 24. The positioning of QSFP module 10 with respect to connector 16 is also evident in this view.

Figure 4:
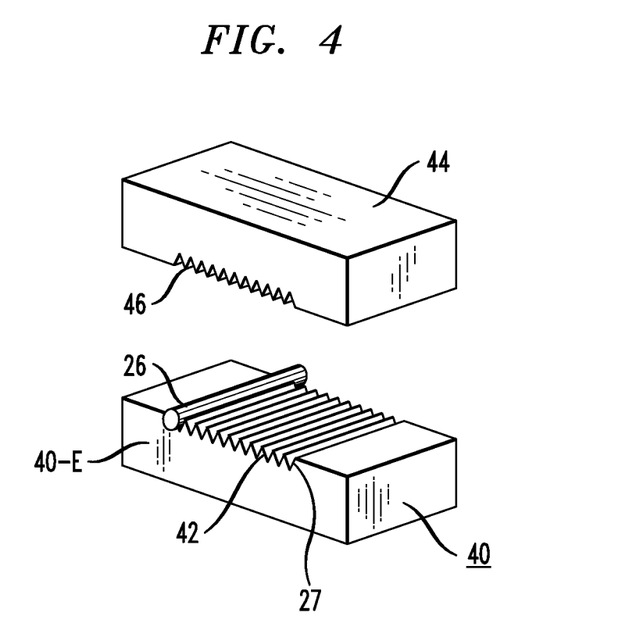
FIG. 4 is an exploded of an exemplary ferrule that may be used within the connector arrangement of one or more embodiments of the present invention.

FIG. 4 is an exploded of an exemplary ferrule that may be used within the connector arrangement of one or more embodiments of the present invention. In this particular illustrated arrangement, ferrule 28 includes a lower portion 40 that is formed to include a plurality of grooves 42 (for example, V-shaped grooves) for supporting the plurality of single mode fiber stubs 26 in a fixed position. In accordance with an aspect of the present disclosure, grooves 42 are formed to maintain a relatively uniform center-to-center spacing between single mode fiber stubs, with this spacing correlated with the spacing between adjacent lens elements 25 in associated lens array 24. It is to be understood that any other suitable groove or channel structure may be formed within lower portion 40 of ferrule 28 to hold single mode fiber stubs 26, as long as the fiber support structure provides the desired essentially uniform center-to-center fiber spacing. For example, U-shaped channels may be used.

As best shown in FIG. 3, single mode fiber stubs 26 are disposed within grooves 42 such that endfaces 27 of single mode fiber stubs 26 are coplanar with endface 40-E of ferrule lower portion 40. In one particular embodiment, single mode fiber stubs 26 may be disposed on lower portion 40, with the arrangement then polished to remove excess fiber material and have endfaces 27 terminate at endface 40-E of lower portion 40.

As also shown in FIG. 4, ferrule 28 further comprises an upper portion 44, which is formed to include a plurality of grooves 46. In particular, upper portion 44 mates with lower portion 40 to completely encase single mode fiber stubs 26 within ferrule 28.

Figure 5:
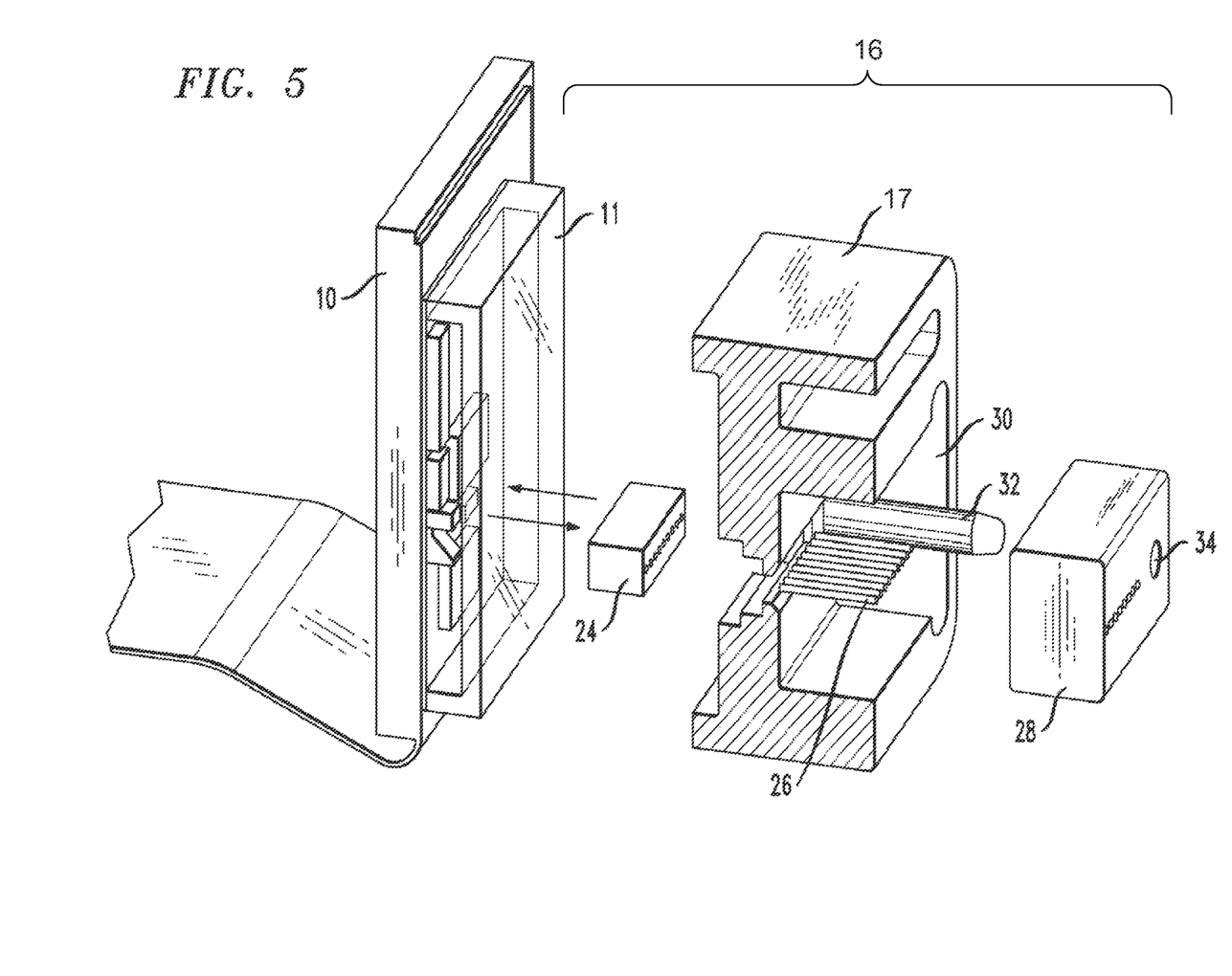
FIG. 5 illustrates an alternative embodiment of the present invention, in this case where the input and output single mode signals from the opto-electronic transceiver module are re-directed 90° to pass through an upper enclosure of the module.

FIG. 5 illustrates an alternative embodiment of the present invention, in this case where the input and output single mode signals from the opto-electronic transceiver module are re-directed 90° to pass through an upper enclosure of the module. Referring to FIG. 5, module 10 is shown as being formed to include a transparent lid 11. In this embodiment, single mode input and output signals (I,O) pass through transparent lid 11 as they pass between module 10 and connector 16. Connector 16 is shown as comprising the same elements as discussed above, with single mode fiber stubs 26 held within ferrule 28 such that each separate single mode fiber stub aligns with a separate lens element 25 within lens array 24. Passive alignment between ferrule 28 and lens array 24 is again provided by alignment fiducials in the form alignment pins 32 and associated alignment holes 34. Again, it is to be understood that various other passive alignment fiducials may be used, including a different number and/or arrangement of fiducials.

As with the embodiment described above, a separate alignment process (active or passive, as the case may be) is used to align connector 16 with module 10, in this case such that each single mode optical output signal O aligns with a lens element 25.

Figure 6:
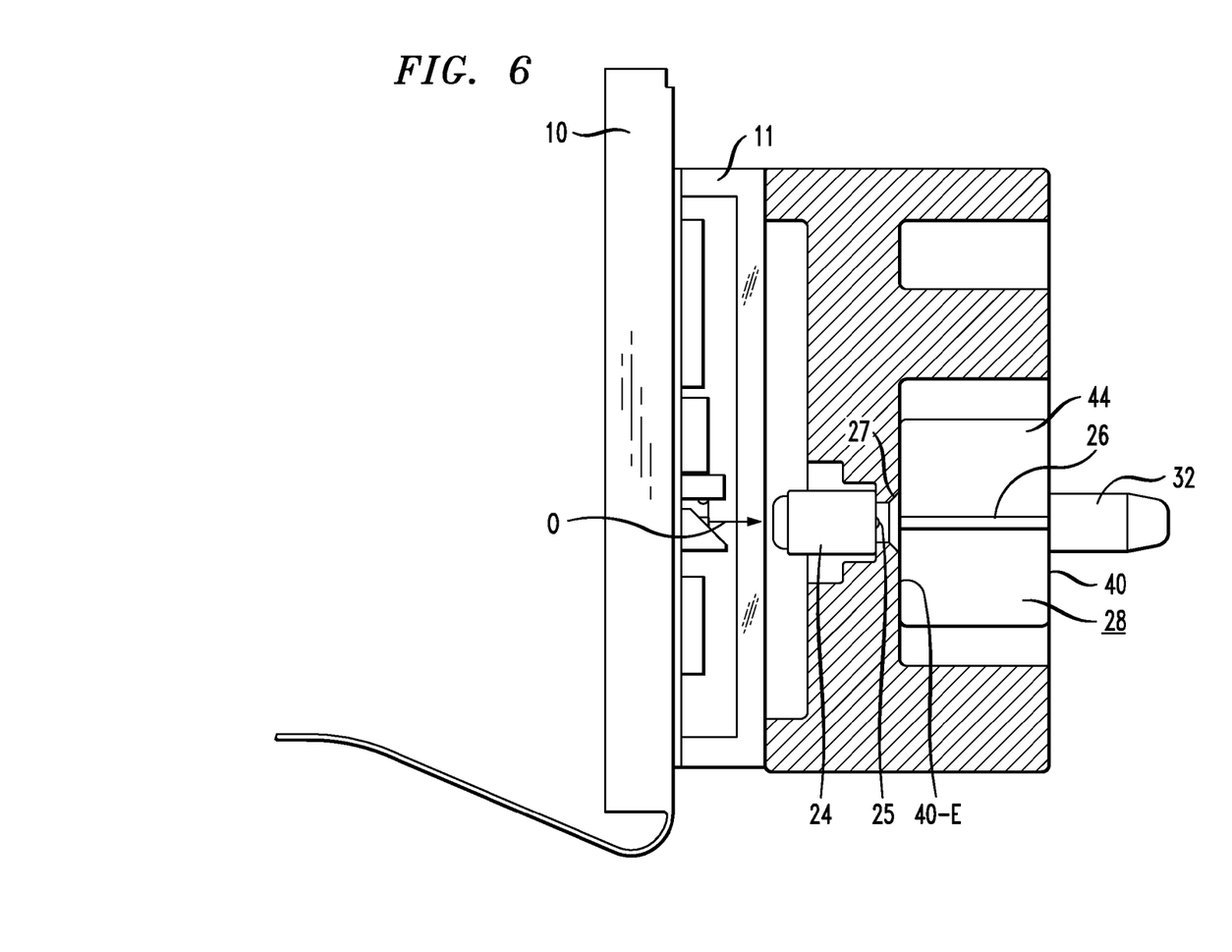
FIG. 6 is a cut-away side view of the embodiment of FIG. 5.

FIG. 6 is a cut-away side view of the embodiment of FIG. 5, showing in this case the re-direction of single mode optical output signal O through lid 10 and into lens element 24. The positioning of endface 27 of single mode fiber 28 with respect to endface 40-E of ferrule 28 is also evident in this view.

While the invention has been described in terms of different embodiments, those skilled in the art will recognize that the invention can be practiced with various modifications that are considered to fall within the spirit and scope of the invention as best defined by the claims appended hereto. Furthermore, while the specification has been described in language specific to structural features and/or methodological acts, the claims are not limited to the features or acts described above. Rather, the specific features and acts described above are disclosed as examples for embodiments of the invention.

What is claimed is:

1. An apparatus for providing single mode optical signal coupling between an opto-electronic transceiver and a single mode optical fiber array, the apparatus comprising:
    a lens array including a plurality of separate lens elements, each of the plurality of lens elements disposed to intercept a separate single mode optical output signal from the opto-electronic transceiver and provide as an output a focused version thereof;
    a connector housing for supporting the lens array, the connector housing including an opening and a first plurality of alignment fiducials disposed within the opening and extending out of the opening along a first direction; and
    a ferrule component including a plurality of single mode fiber stubs and a second plurality of alignment fiducials, the ferrule component disposable within the connector housing opening such that the second plurality of alignment fiducials mate with the first plurality of alignment fiducials before the ferrule component is at least partly disposed within the connector housing opening and the plurality of single mode fiber stubs passively align with respective ones of the plurality of lens elements in at least two axes normal to the first direction,
    wherein the plurality of single mode fiber stubs are entirely disposed within the ferrule component.

2. The apparatus as defined in claim 1, wherein the first plurality of alignment fiducials comprises a pair of alignment fiducials and the second plurality of alignment fiducials comprises a mating pair of alignment fiducials.

3. The apparatus as defined in claim 1, wherein the first plurality of alignment fiducials comprises a plurality of pins extending outward from the connector housing and the second plurality of alignment fiducials comprises a plurality of holes formed within the ferrule component.

4. The apparatus as defined in claim 3, wherein the first plurality of alignment fiducials comprises a pair of alignment pins disposed on opposite sides of the connector housing opening and the second plurality of alignment fiducials comprises a pair of alignment holes disposed on opposite sides of an endface termination of the ferrule component.

5. The apparatus as defined in claim 1, wherein the ferrule component comprises a first, lower portion and a second, upper portion, with the first, lower portion including a plurality of grooves for supporting the plurality of single mode fiber stubs.

6. The apparatus as defined in claim 5, wherein the plurality of grooves are formed to create an essentially uniform center-to-center spacing between adjacent single mode fiber stubs of the plurality of single mode fiber stubs.

7. The apparatus as defined in claim 5, wherein the plurality of grooves comprises a plurality of at least one of V-shaped grooves and U-shaped grooves.

8. A system, comprising:
    an opto-electronic transceiver for generating a plurality of single mode optical output signals and receiving a plurality of single mode optical input signals;
    a cable comprising an array of single mode optical fibers; and
    a connector disposed between the opto-electronic transceiver and the cable for creating aligned optical signal paths therebetween, the connector comprising:
        a lens array including a plurality of separate lens elements, each of the plurality of lens elements disposed to intercept a separate single mode optical output signal from the opto-electronic transceiver and provide as an output a focused version thereof;
        a connector housing for supporting the lens array, the connector housing including an opening and a first plurality of alignment fiducials disposed within the opening and extending out of the opening along a first direction; and
        a ferrule component including a plurality of single mode fiber stubs and a second plurality of alignment fiducials, the ferrule component disposable within the connector housing such that the second plurality of alignment fiducials mate with the first plurality of alignment fiducials when the ferrule component is disposed within the connector housing opening and the plurality of single mode fiber stubs passively align with respective ones of the plurality of lens elements in at least two axes normal to the first direction,
        wherein the plurality of single mode fiber stubs are entirely disposed within the ferrule component.

9. The apparatus as defined in claim 8, wherein the first plurality of alignment fiducials comprises a pair of alignment fiducials and the second plurality of alignment fiducials comprises a mating pair of alignment fiducials.

10. The apparatus as defined in claim 8, wherein the first plurality of alignment fiducials comprises a plurality of pins extending outward from the connector housing and the second plurality of alignment fiducials comprises a plurality of holes formed within the ferrule component.

11. The apparatus as defined in claim 10, wherein the first plurality of alignment fiducials comprises a pair of alignment pins disposed on opposite sides of the connector housing opening and the second plurality of alignment fiducials comprises a pair of alignment holes disposed on opposite sides of an endface termination of the ferrule component.

12. The apparatus as defined in claim 8, wherein the ferrule component comprises a first, lower portion and a second, upper portion, with the first, lower portion including a plurality of grooves for supporting the plurality of single mode fiber stubs.

13. The apparatus as defined in claim 12, wherein the plurality of grooves are formed to create an essentially uniform center-to-center spacing between adjacent single mode fiber stubs of the plurality of single mode fiber stubs.

14. The apparatus as defined in claim 12, wherein the plurality of grooves comprises a plurality of at least one of V-shaped grooves and U-shaped grooves.

15. The apparatus as defined in claim 8, wherein the connector is disposed in an in-line connection configuration with the opto-electronic transceiver.

16. The apparatus as defined in claim 8, wherein the connector is disposed in a 90° oriented configuration with the opto-electronic transceiver, the opto-electronic transceiver including a transparent lid and configured to transmit single mode optical output signals through the transparent lid and into the connector.

17. The apparatus as defined in claim 8, wherein the connector is actively aligned to opto-electronic transceiver such that the plurality of single mode optical output signals are coupled into the lens elements of the connector lens array.

18. A system, comprising:
   a quad small form factor pluggable (QSFP) transceiver module for supporting the transmission of a set of four single mode optical output signals and the reception of a set of four single mode optical input signals;
   a multiple fiber push-on/pull-off (MPO) optical fiber cable including an array of single mode optical fibers; and
   a connector for coupling the QSFP transceiver module to the MPO single mode optical fiber cable, the connector comprising
   a lens array including a plurality of separate lens elements, each of the plurality of lens elements disposed to intercept a separate single mode optical output signal from the opto-electronic transceiver and provide as an output a focused version thereof;
   a connector housing for supporting the lens array, the connector housing including an opening and a first plurality of alignment fiducials within the opening and extending out of the opening along a first direction; and
   a ferrule component including a plurality of single mode fiber stubs, the ferrule component disposable within the connector opening and further comprising a second plurality of alignment fiducials that mate with the first plurality of alignment fiducials when the ferrule component is disposed within the connector opening so as to passively align the plurality of single mode fiber stubs with respective ones of the plurality of lens elements in at least two axes normal to the first direction,
   wherein the plurality of single mode fiber stubs are entirely disposed within the ferrule component.

* * * * *

UNITED STATES PATENT AND TRADEMARK OFFICE
CERTIFICATE OF CORRECTION

PATENT NO. : 9,435,965 B2  
APPLICATION NO. : 13/755843  
DATED : September 6, 2016  
INVENTOR(S) : Chris Kiyoshi Togami et al.

Page 1 of 1

It is certified that error appears in the above-identified patent and that said Letters Patent is hereby corrected as shown below:

Title page, item (72), in column 1, in "Inventors", line 3, delete "Orefiled, PA" and insert -- Orefield, PA --, therefor.

Title page, item (72), in column 1, in "Inventors", line 4, delete "Bridgwater, NJ" and insert -- Bridgewater, NJ --, therefor.

Signed and Sealed this  
Fifteenth Day of November, 2016

Michelle K. Lee  
*Director of the United States Patent and Trademark Office*